United States Patent Office 2,701,317
Patented Feb. 1, 1955

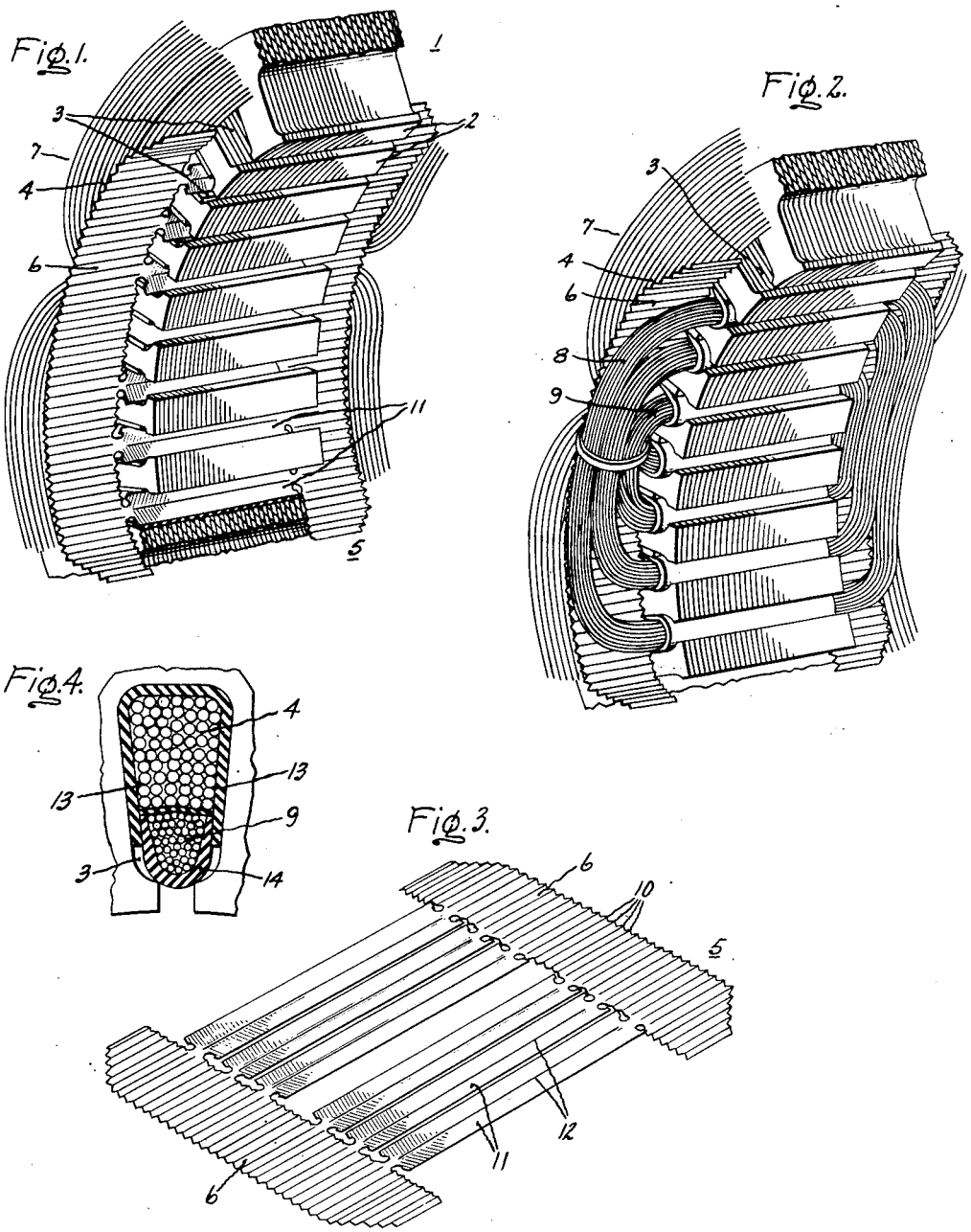

2,701,317

DYNAMOELECTRIC MACHINE WINDING INSULATOR

Clairmont J. Herman, Fort Wayne, Ind., assignor to General Electric Company, a corporation of New York Application November 18, 1953, Serial No. 392,792

4 Claims. (Cl. 310—215)

This invention relates to winding insulation for dynamoelectric machines and more particularly to an improved type of between-phase insulation.

In alternating current dynamoelectric machines, such as single phase induction motors, a plurality of phase windings are used. The windings are formed of wire covered with some type of insulating material such as enamel. It is highly desirable, where different phase windings are wound in the same slots, to further insulate them from each other. This need arises because of the difficulty and expense of eliminating the breaks, caused by abrasion and various other factors, in the enamel covering the wire forming the winding. Since each phase winding will probably have a different voltage, any electrical connection between the two phases, caused by breaks in the enamel, would be highly detrimental to the operation of the machine. In view of this, a separate insulator is generally placed between the windings, both at the end turns and in the core slots. This insulator is frequently a single integral piece. Up to the present time considerable difficulty has been encountered in maintaining economy in the manufacture and yet achieving an insulator which will assume a proper position within the core slot so as to obtain complete insulation between the windings. Another fact detracting from economical manufacture has been the need for different size insulators for each different size winding. It is therefore desirable to provide an insulator, for dynamoelectric machines having a plurality of phase windings, which is adjustable in size, economical as to manufacture, and which will provide positive insulation at all times between the windings, both at the end turns and in the slots.

An object of this invention is therefore to provide an insulator for dynamoelectric machines which will incorporate the qualities described above.

Further objects and advantages of this invention will become apparent and the invention will be better understood by reference to the following description and the accompanying drawing. The features of novelty which characterize this invention will be pointed out with particularity in the claims annexed to and forming a part of this specification.

In accordance with a preferred embodiment of this invention, the portions of the phase insulation which lie between the winding end turns are crimped to permit stretching. The center portions which fit into the stator slots are V or U-shaped to permit them to expand against the sides of the slots. Because of the V or U-shape the center portions will completely cover the slots whatever the width at the particular point dictated by the size of the windings.

In the drawing Fig. 1 is a view in perspective of a section of a stator core, with one phase winding and the novel insulator of this invention inserted in the slots.

Fig. 2 is the same view as Fig. 1 with a second phase winding inserted in the slots over the insulator.

Fig. 3 is a view in perspective of the novel insulator of this invention.

Fig. 4 is a view in cross-section of a single slot in which the insulator is utilized.

Referring now to Fig. 1 there is shown a section of a motor stator member of a single phase alternating current induction motor, generally indicated at 1. Stator teeth 2 form between them slots 3 in which phase winding 4, formed of a plurality of turns of enameled wire, is wound. After winding 4 is properly in place in the slots, between-phase insulator 5, to be more fully described below, is then inserted.

Insulator 5 is formed of relatively thin sheet insulating material and has two spaced apart portions 6; when the insulator is in place these portions 6 lie between end turns 7 of winding 4 and end turns 8 of winding 9, as shown in Fig. 2, in order to prevent shorting therebetween. When insulator 5 is manufactured, portions 6 are crimped as shown at 10. Crimps 10 permit a single size of insulator to be used whatever the relative radial thicknesses of windings 4 and 9. This is achieved by a spreading out of crimps 10 when a smaller winding 4 is used. Portions 6 are connected by center portions or legs 11. These fit within slots 3 between the portions of windings 4 and 9 which are therein, and have a V-shaped cross-section, being creased along line 12. Because of the V-shape, when a relatively resilient material such as polyethylene terephthalate is used, legs 11 will expand against the sides of slots 3 to span the slots and be held relatively firmly. Furthermore legs 11 are easy to insert during manufacture since a slight pressure along line 12 with some sharp tool will force the leg down into the slot 3. Once inside slot 3 leg 11 will then expand to about the sides of the slot and will therefore remain in a position insuring insulation between windings 4 and 9. Fig. 4 clearly shows how leg 11 expands, once it has been inserted into slot 3, to about the sides 13 of the slot. It will be understood, of course, that it is the general feature of resiliency that is important in legs 11. Thus, imparting some slightly different shape to them, such as a U-shape rather than a V-shape will be equally effective to achieve the desired result.

The V-shape of legs 11 further insures complete insulation wherever they be placed in slots 3, since use with a smaller winding 4 and therefore placement of legs 11 farther out in slots 3 will merely result in a greater expansion of the V in order to abut the sides 13 of the slot. Once insulation 5 is properly in place, winding 9 is placed in the slots 3, insulation 14 is placed over winding 9, and the winding assembly is then complete.

It will now be seen that this invention achieves a novel insulator, for use between the windings of a dynamoelectric machine, which is economical, adjustable to different size windings, and insures complete insulation at all points between the windings. The insulator has been described in connection with a single phase induction motor, but it is clear that it may be used to equal advantage in any other dynamoelectric machine having two or more phase windings, such as a standard three phase motor.

While the invention has been explained by describing a particular embodiment thereof it will be apparent that improvements and modifications may be made without departing from the scope of the invention as defined in the appended claims.

What I claim as new and desire to secure by Letters Patent of the United States is:

1. In a motor core having at least two phase windings wound in slots in said core, a phase insulator of resilient sheet material comprising spaced apart and crimped end portions adapted to fit between the end turns of said phase windings, and legs joining said portions and adapted to be arranged in said slots between said windings, said legs being formed to expand against the sides of said slots upon insertion therein.

2. In a motor core having at least two phase windings wound in slots in said core, a phase insulator comprising spaced apart end portions adapted to fit between the end turns of said phase windings, and legs joining said portions, said legs being formed of a relatively thin sheet insulating resilient material and respectively having substantially V-shaped cross-sections whereby upon insertion of said legs in said slots said legs will expand to abut the sides of said slots thereby spanning the same.

3. In a motor core having at least two phase windings wound in slots in said core, a thin phase insulator of resilient material comprising parallel spaced apart expansible end portions adapted to fit between the end turns of said phase windings, and legs joining said portions, said legs respectively having a V-shaped cross-section and being so arranged in said slots as to have each edge of each of said legs abutting an opposite side of a slot.

4. In a motor core having at least two phase windings wound in slots in said core, a phase insulator formed of relatively thin sheet insulating resilient material, said insulation comprising two spaced apart parallel crimped end portions adapted to fit between the end turns of said phase windings, and legs joining said portions and respectively having V-shaped cross-sections, said legs being adapted to be arranged in said slots between said phase windings and spanning said slots so as to have each edge of said legs abutting an opposite side of a slot.

References Cited in the file of this patent

UNITED STATES PATENTS

| | | |
|---|---|---|
| 1,589,817 | Reardon | June 22, 1926 |
| 2,443,455 | Herman | June 15, 1948 |
| 2,502,068 | Anderson | Mar. 28, 1950 |